Figure 1:
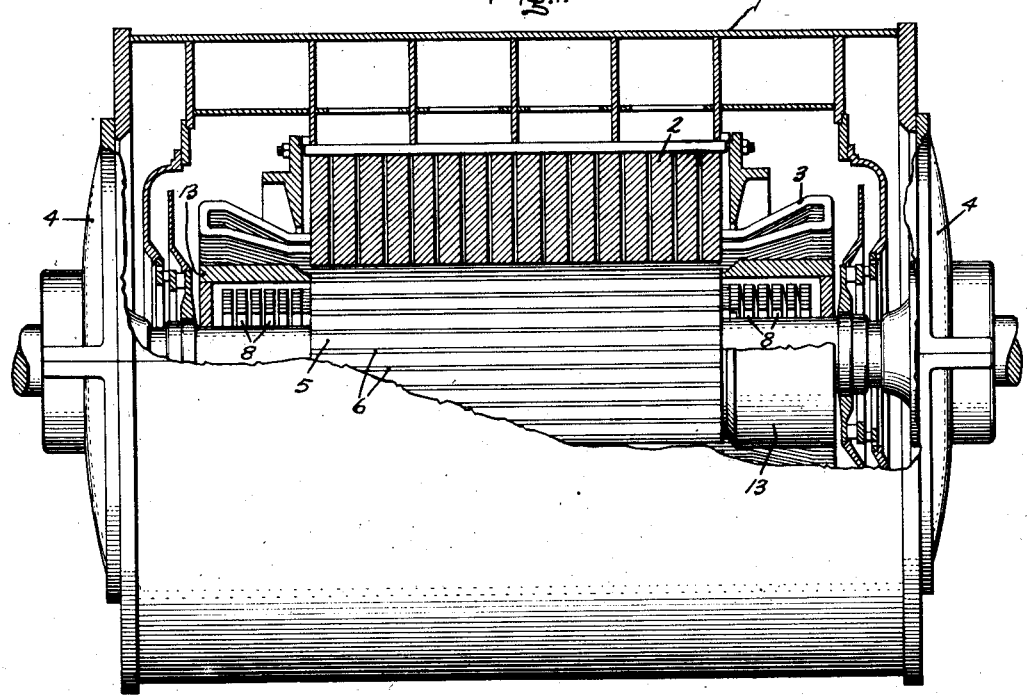

Feb. 5, 1946.    M. A. SAVAGE ET AL    2,394,110

DYNAMO-ELECTRIC MACHINE

Filed Nov. 18, 1944

Inventors:
Marion A. Savage,
Milton F. Kent,
by Harry E. Dunham
Their Attorney.

Patented Feb. 5, 1946

2,394,110

UNITED STATES PATENT OFFICE 2,394,110

DYNAMOELECTRIC MACHINE

Marion A. Savage, Scotia, and Milton F. Kent, Schenectady, N. Y., assignors to General Electric Company, a corporation of New York Application November 18, 1944, Serial No. 564,077

8 Claims. (Cl. 171—252)

Our invention relates to dynamoelectric machines and particularly to machines of this type which are adapted to be used as high speed turbo alternators.

An object of our invention is to provide an improved dynamoelectric machine provided with a composite metal winding for increasing the capacity of the machine.

Another object of our invention is to provide an improved dynamoelectric machine of the type used as a high speed turbine alternator with a special type winding for increasing the capacity of the machine for a given size.

A further object of our invention is to provide improved windings for a dynamoelectric machine.

Further objects and advantages of our invention will become apparent and our invention will be better understood from the following description referring to the accompanying drawing, and the features of novelty which characterize our invention will be pointed out with particularity in the claims annexed to and forming part of this specification.

Figure 2:
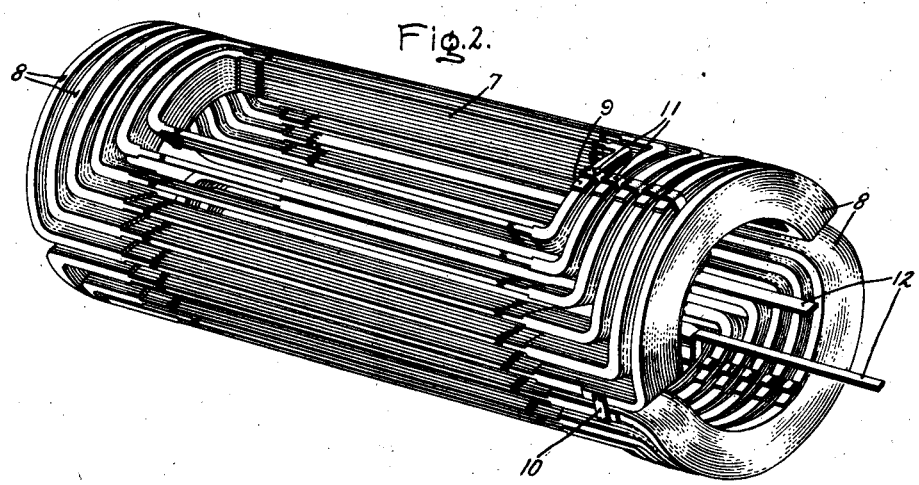

In the drawing:

Fig. 1 is a side elevational view, partly broken away, of a turbine generator provided with an embodiment of our invention; and Fig. 2 is a perspective view of a winding embodying our invention, such as might be used in the rotatable member of the machine shown in Fig. 1.

Referring to the drawing, we have shown our invention in connection with a dynamoelectric machine adapted to be used as a high speed turbine generator. This machine is provided with a stationary member having an outer frame 1 and a laminated core member 2 provided with a stationary armature winding 3 arranged in winding slots in the core 2. Excitation is provided to this machine by a rotatable member which is mounted in suitable bearings in the end shield 4 of the stationary member of the machine. This rotatable member includes a core 5 of magnetic material having winding slots 6 extending longitudinally therethrough in which an exciting winding is adapted to be arranged. In high speed machines adapted to operate at 3,000 revolutions per minute or more, the capacity of the machine for a given size may be increased by increasing the conductivity of the conductors in the exciting winding. In the past, high conductivity has been attained by using soft drawn copper as the material of which these windings are made. However, it has been found that in time certain distortions of this soft drawn copper winding is apt to occur and thereby limit the life of the rotor. It is desirable, therefore, that this type exciting winding should be made of a high conductivity material, such as a cupreous alloy having high strength in tension and compression to stand the stresses imposed on the winding by centrifugal and thermal expansive forces. The use of windings made entirely of copper or of copper alloys on these high speed machines imposes very high stresses on the end or retaining ring which hold the end turns of the coils in position, and in certain instances, these forces become so great as to require the size of the winding to be limited, thereby limiting the capacity of the machine. It is desirable, therefore, that these end turns should be made of a relatively light weight high conductivity material, such as aluminum, thereby reducing the stresses on the retaining ring to values which can be withstood by materials available at present for these purposes. In order to attain this improved winding to increase the capacity of this type machine, we provide an exciting winding to the rotatable member which is formed of coils, each formed of a plurality of turns in which the side turns 7 are formed of cupreous material, such as a copper alloy, having a relatively high strength in tension and compression and a relatively high conductivity, and the end turns 8 of these coils are formed of a relatively high conductivity material having a relatively light weight. These end turns are preferably formed of a material having a specific gravity less than 3.5 and may be made of aluminum, which has a specific gravity of approximately 2.7, or magnesium, having a specific gravity of approximately 1.74, and the range of specific gravity of materials used in making these end turns is preferably a light weight high conductivity metal having a specific gravity between 1.5 and 3.0. In order to complete the windings and to make the proper connections between the end turns and the side turns of the coils, the end turns 8 are welded to the side turns 7, and the ends of the end turns 8 are formed with terminal elements 9 of cupreous material welded thereto which are connected to terminals on the ends of the other coils to provide a continuous winding for the machine. As shown in Fig. 2, the coils are arranged to provide a bipolar rotor, and the two sets of coils are interconnected by a strap 10 of cupreous material mechanically connected to the terminals on the two adjacent end turns 8 of the two sets of coils. The interconnecting elements between the coils are preferably mechanically connected to the cupreous terminal element 9 and are preferably formed as laminated straps 11 of cupreous material. The ends of the two sets of coils, which in Fig. 2 are the inner turn of the inner coils, are connected by conductors 12 to suitable slip rings for connecting to a source of direct current electrical power supply for suitably energizing the winding. If desired, the connections between coils may be brazed, although it is preferable that these connections should be mechanically made in order to facilitate replacement of coils should this become necessary. In this manner, the end turns 8 will be sufficiently light so as not to impose undue stresses on the retaining end rings 13 of the machine, while the intermediate side turn portions 7 will have the desired strength in tension and compression to withstand the centrifugal forces imposed thereon, and will have a relatively smaller size than the end-turned portion of the coils, thereby permitting a more efficient use of the magnetic material forming the core 5 and permitting the use of a smaller diameter rotatable member to provide the same desired amount of excitation to the machine. In machines such as that illustrated in the drawing, it is desirable to provide hydrogen cooling so that the windage losses may be decreased and the cooling effects of the hydrogen on the machine will also further increase the capacity of the machine for a given size and enable the machine to operate at relatively higher efficiency.

While we have illustrated and described a particular embodiment of our invention, modifications thereof will occur to those skilled in the art. We desire it to be understood, therefore, that our invention is not to be limited to the particular arrangement disclosed, and we intend in the appended claims to cover all modifications which do not depart from the spirit and scope of our invention.

What we claim as new and desire to secure by Letters Patent of the United States is:

1. A dynamoelectric machine comprising a stationary member and a rotatable member, and a winding in said rotatable member formed of coils having cupreous material side turns with aluminum end turns welded thereto.

2. A dynamoelectric machine comprising a stationary member and a rotatable member, a winding in said rotatable member formed of coils having side turns of copper with end turns of light weight metal of specific gravity between 1.5 and 3.0, and means connected to said end turns for forming said coils.

3. A dynamoelectric machine comprising a stationary member and a rotatable member, a winding in said rotatable member formed of coils having cupreous material side turns with aluminum end turns welded thereto, and means of cupreous material connected to said end turns for forming said coils.

4. A dynamoelectric machine comprising a stationary member and a rotatable member, a winding in said rotatable member formed of coils having cupreous material side turns with aluminum end turns welded thereto having terminals of cupreous material welded to said end turns, and means including flexible laminated strips of cupreous material mechanically connected to said cupreous material terminals for forming said coils.

5. A high speed turbine generator comprising a stationary member and a rotatable member adapted to be operated at 3,000 or more revolutions per minute, a winding in said rotatable member formed of coils having cupreous material side turns with aluminum end turns welded thereto having terminals of cupreous material welded thereto, and means including flexible laminated strips of cupreous material mechanically connected to said cupreous material terminals for forming said coils.

6. A high speed turbine generator comprising a stationary member and a rotatable member adapted to be operated at 3,000 or more revolutions per minute, said rotatable member having a core of magnetic material with winding slots therein, a winding for said rotatable member formed of coils having side turns of cupreous material arranged in said winding slots with end turns welded thereto of light weight metal of specific gravity of less than 3.5 having terminals of cupreous material welded thereto, and means of cupreous material connected to said cupreous material terminals for forming said coils.

7. A winding for dynamoelectric machines having side turns of cupreous material and end turns welded thereto of light weight metal of specific gravity of less than 3.5.

8. A winding for dynamoelectric machines having side turns of cupreous material with end turns welded thereto of light weight metal of specific gravity of less than 3.5, and terminals of cupreous material welded to said end turns.

MARION A. SAVAGE.
MILTON F. KENT.